US012387652B2

(12) United States Patent
Farrokh Baroughi et al.

(10) Patent No.: US 12,387,652 B2
(45) Date of Patent: Aug. 12, 2025

(54) DYNAMIC VRESET AND VSSEL TUNING FOR BETTER LOW GRAY ACCURACY AND POWER SAVING

(71) Applicant: Apple Inc., Cupertino, CA (US)

(72) Inventors: Mahdi Farrokh Baroughi, Santa Clara, CA (US); Hopil Bae, Palo Alto, CA (US); Seung B Rim, Pleasanton, CA (US); Haitao Li, Mountain View, CA (US); Sunmin Jang, Sunnyvale, CA (US); Ce Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/204,927

(22) Filed: Jun. 1, 2023

(65) Prior Publication Data

US 2024/0005833 A1 Jan. 4, 2024

Related U.S. Application Data

(60) Provisional application No. 63/357,493, filed on Jun. 30, 2022.

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0842* (2013.01); *G09G 2310/08* (2013.01); *G09G 2320/041* (2013.01); *G09G 2330/021* (2013.01); *G09G 2354/00* (2013.01)

(58) Field of Classification Search
CPC ............... G09G 3/2007; G09G 3/3233; G09G 2300/0842; G09G 2310/08; G09G 2320/041; G09G 2330/021; G09G 2354/00
See application file for complete search history.

(56) References Cited

U.S. PATENT DOCUMENTS 7,230,596 B2 6/2007 Guo et al.
10,229,636 B2 3/2019 Kim et al.
10,522,084 B2 12/2019 Zhang et al.
(Continued)

OTHER PUBLICATIONS

P. Stanley-Marbell, "A mobile client platform for sensor networks," ES reports, vol. 2008-04, Jan. 1, 2008, Eindhoven: Technische Universiteit Eindhoven, accessed via: http://citeseerx.ist.psu.edu/viewdoc/download?doi=10.1.1.1039.8177&rep=rep1&type=pdf.

*Primary Examiner* — Ariel A Balaoing
(74) *Attorney, Agent, or Firm* — Fletcher Yoder, P.C.

(57) ABSTRACT

A control circuit adjusts a value of a source supply voltage VSSEL provided to a display area in an electronic display. The control circuit also adjusts a voltage Vreset applied to the display area to cause the display area to emit light more uniformly under various ambient conditions (e.g., temperature) surrounding the display area. Dynamically changing Vreset is employed to make anode charging dynamics independent of temperature. The control circuit adjusts the source supply voltage VSSEL and the voltage Vreset together to compensate display pixel hysteresis effects and display artifacts caused by temperature changes and brightness changes of the display area and collectively produce images. Dynamically tuning the Vreset and the VSSEL voltages also saves power and improves gray level accuracy for the electronic display.

22 Claims, 15 Drawing Sheets

(56) References Cited

U.S. PATENT DOCUMENTS

| | | | | |
|---|---|---|---|---|
| 10,665,157 | B2 | 5/2020 | Lin et al. | |
| 11,263,967 | B2 | 3/2022 | Nielsen et al. | |
| 2002/0000962 | A1* | 1/2002 | Miura | G09G 3/3651 345/87 |
| 2006/0044234 | A1 | 3/2006 | Shimonishi | |
| 2007/0132674 | A1* | 6/2007 | Tsuge | G09G 3/2074 345/77 |
| 2007/0222743 | A1 | 9/2007 | Hirakata | |
| 2011/0102410 | A1* | 5/2011 | Cho | G09G 3/3291 345/212 |
| 2018/0061311 | A1* | 3/2018 | Lin | G09G 3/32 |
| 2019/0096337 | A1* | 3/2019 | Zhu | G09G 3/3258 |
| 2019/0304372 | A1* | 10/2019 | Pyo | G01K 3/10 |
| 2019/0325816 | A1* | 10/2019 | Lin | G09G 3/3208 |
| 2019/0378454 | A1* | 12/2019 | Jin | G09G 3/3225 |
| 2021/0225275 | A1* | 7/2021 | Cho | G09G 3/3233 |
| 2021/0305353 | A1* | 9/2021 | Ono | H10K 59/1213 |
| 2022/0076627 | A1 | 3/2022 | Kim et al. | |
| 2022/0180819 | A1* | 6/2022 | Ono | G09G 3/3233 |
| 2023/0144298 | A1* | 5/2023 | Koo | G09G 3/3291 345/204 |

* cited by examiner

DYNAMIC VRESET AND VSSEL TUNING FOR BETTER LOW GRAY ACCURACY AND POWER SAVING

CROSS-REFERENCE TO RELATED APPLICATIONS

This application claims priority to and benefit of U.S. Provisional Application No. 63/357,493, filed Jun. 30, 2022, and entitled "DYNAMIC VRESET AND VSSEL TUNING FOR BETTER LOW GRAY ACCURACY AND POWER SAVING," which is incorporated herein by reference in its entirety for all purposes.

SUMMARY

This disclosure relates to systems, methods, and devices to improve gray level accuracy and save power by dynamically tuning VSSEL and/or Vreset voltages applied to display pixels on electronic displays.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

In certain electronic display devices, light-emitting diodes such as organic light-emitting diodes (OLEDs), micro-LEDs (μLEDs), or micro display-based OLEDs may be employed as pixels to depict a range of gray levels for display. However, due to various properties associated with ambient conditions (e.g., temperature) surrounding a display panel, display properties (e.g., display usage, aging) of the display panel or pixels within the display panel, an expected gray level output by one or more pixels in a display device may be different from an actual gray level output by the pixels in the display device upon receiving a certain electrical input. For example, as the ambient temperature in which a display panel operates changes, a bias voltage associated with the components within a pixel driving circuit may also change. As such, the current provided to illuminate a pixel may change due to the change in the bias voltage. As a result, the pixel may illuminate differently than expected.

To ensure that the pixels of a display device accurately depict the desired gray levels in accordance with the provided image data, a control circuit may be disposed within the display device. The control circuit may adjust a voltage of a supply voltage (e.g., VSSEL) that provides a voltage to various components (e.g., light-emitting diode) within the control circuit. By dynamically adjusting the voltage of the supply voltage (VSSEL), the control circuit may adjust the driving current received by the LED. In certain embodiments, the adjusted supply voltage (VSSEL) may be coupled to pixel circuits that are used to drive each pixel in the display device. In this way, the control circuit may compensate for bias voltage effects present in the pixel driving circuits of the display that may be caused by ambient conditions or the like.

The control circuit may also adjust a voltage Vreset (e.g., a reset voltage added to an anode of a display pixel) applied to the display pixel to cause the display pixel to emit light more uniformly under various ambient conditions (e.g., temperature) surrounding the display pixels. For example, temperature changes anode charging dynamics of the display pixels, which in turn change the emitted light from the display pixels. Dynamically changing Vreset may be used to make anode charging dynamics independent of temperature.

By dynamically changing the Vreset and the VSSEL voltages, the electronic display may save power. For instance, the Vreset and the VSSEL may use smaller values of voltage at higher temperatures than lower temperatures. VSSEL and Vreset may be provided by the same or different sources. Accordingly, less power may be needed at higher temperatures than at lower temperatures.

The voltage Vreset and the supply voltage VSSEL may be determined through calibration by testing different turn on voltages and source voltages for different conditions to reduce or eliminate image artifacts. Different conditions that may be considered include, among other things, a current display panel temperature, a current global brightness setting, a current refresh rate, and properties of the image content of the image frame to be displayed on the electronic display, display panel age, and so forth. Once calibration has been used to determine the Vreset and the VSSEL for different conditions, the voltages may be stored and used by the electronic display while in operation.

The voltages may be stored in a lookup table on a display driver integrated circuit (DIC). The lookup table may take any suitable form. In one example, the lookup table may be a two-dimensional lookup table that receives a current global brightness setting and a current display panel temperature and outputs a sequence of bias voltages for those conditions. When the sequence of bias voltages is applied to display pixels for a corresponding sequence of subframes, the display pixel hysteresis effects may be counteracted and display artifacts may be reduced or eliminated.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to electronic displays that use dynamic tuning of source voltage (e.g., VSSEL) and dynamic tuning of precharge voltage (e.g., Vreset) to accurately depict the desired gray levels in accordance with the provided image data under various ambient conditions (e.g., temperature), particularly at low gray levels. This dynamic Vreset and VSSEL tuning may save power, and may reduce or eliminate certain image artifacts, such as flicker or variable refresh rate luminance difference.

Figure 1:
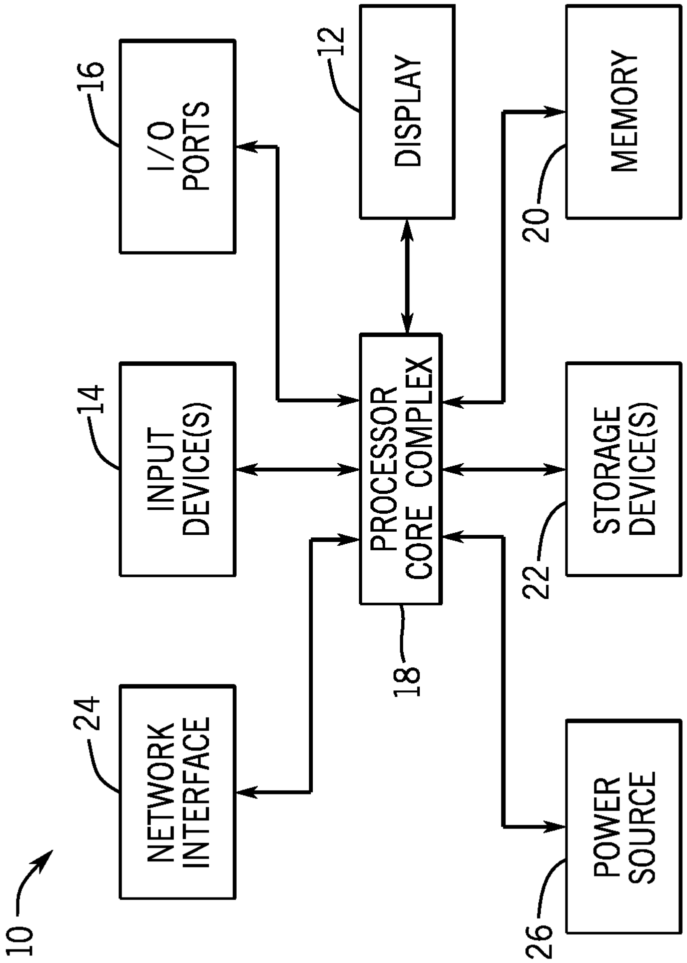
FIG. 1 is a schematic block diagram of an electronic device, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
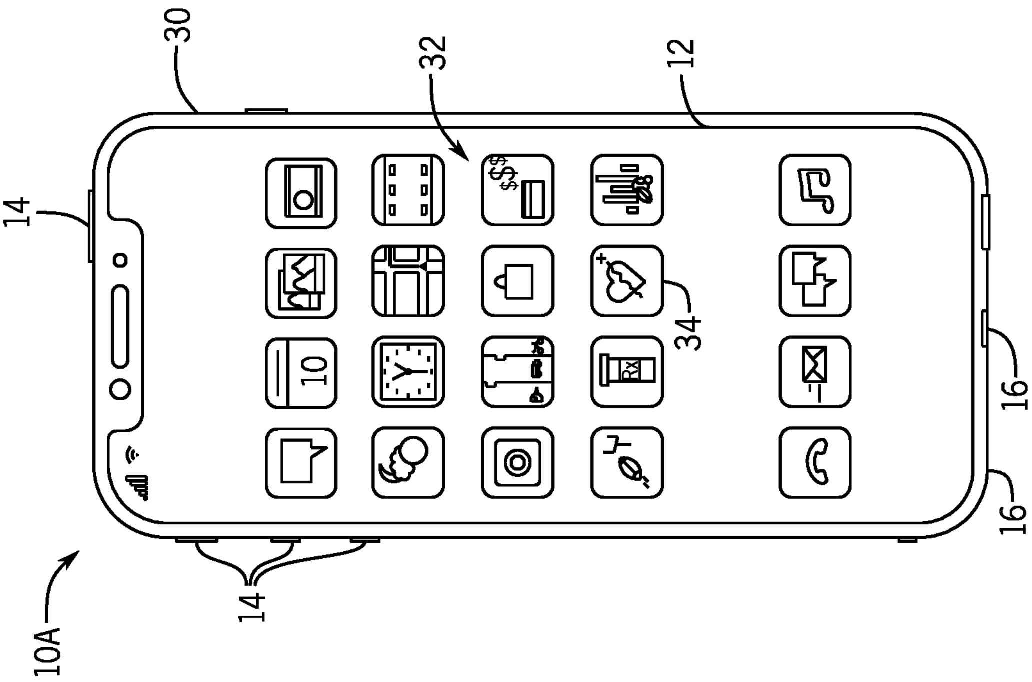
FIG. 2 is a front view of a mobile phone representing an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
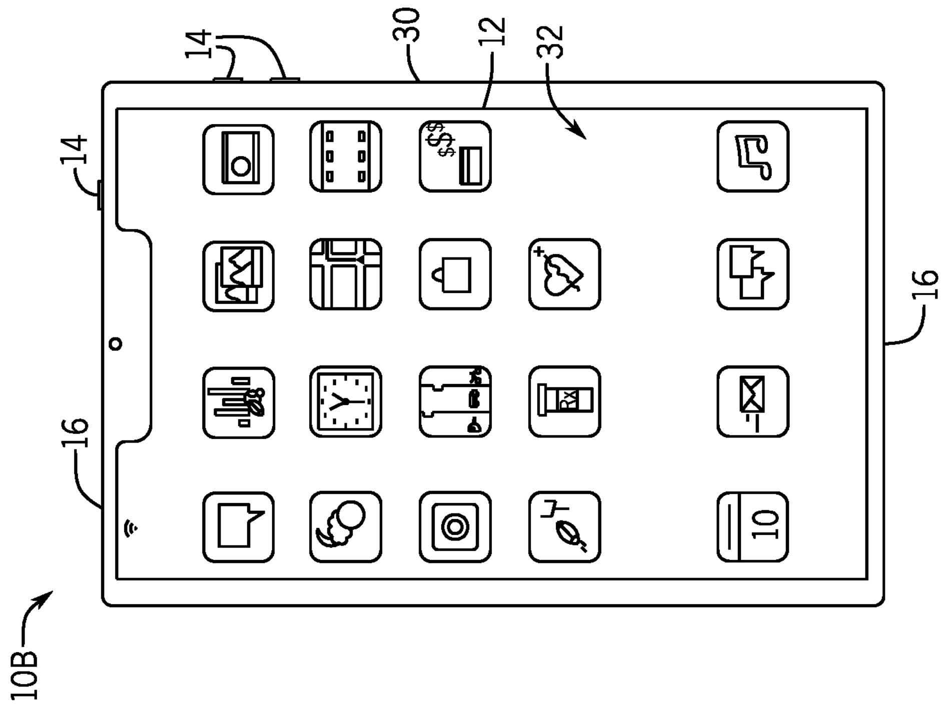
FIG. 3 is a front view of a tablet device representing an example of the electronic device of FIG. 1, in accordance with an embodiment.
Figure 4:
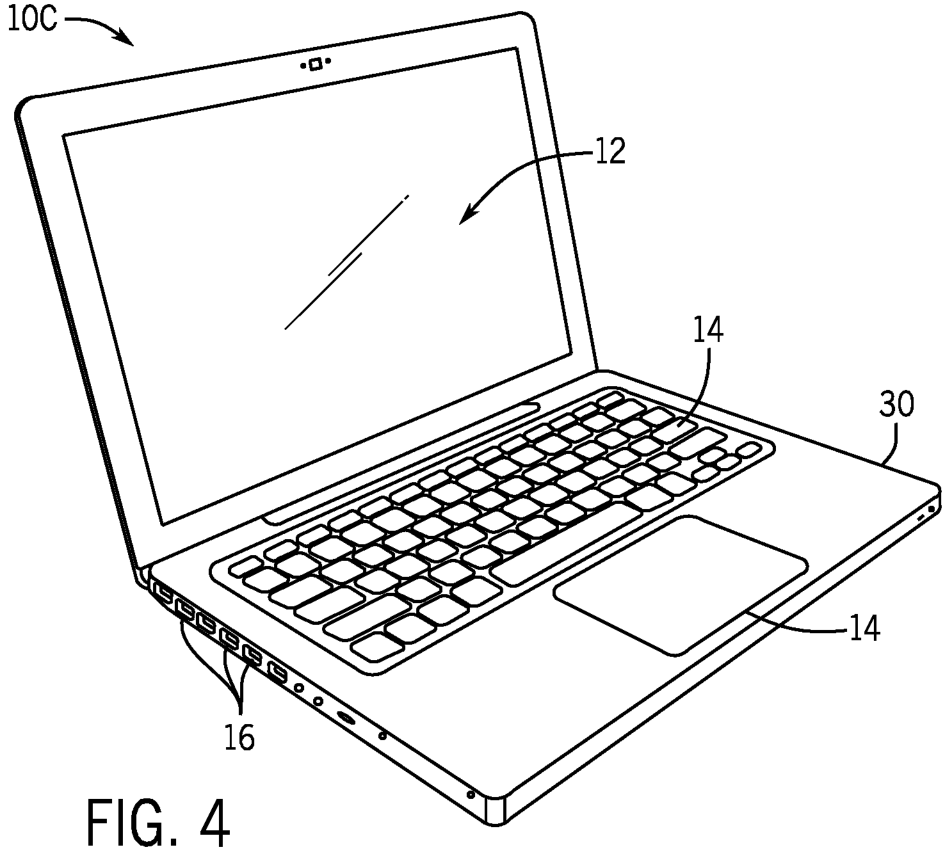
FIG. 4 is a front view of a notebook computer representing an example of the electronic device of FIG. 1, in accordance with an embodiment.
Figure 5:
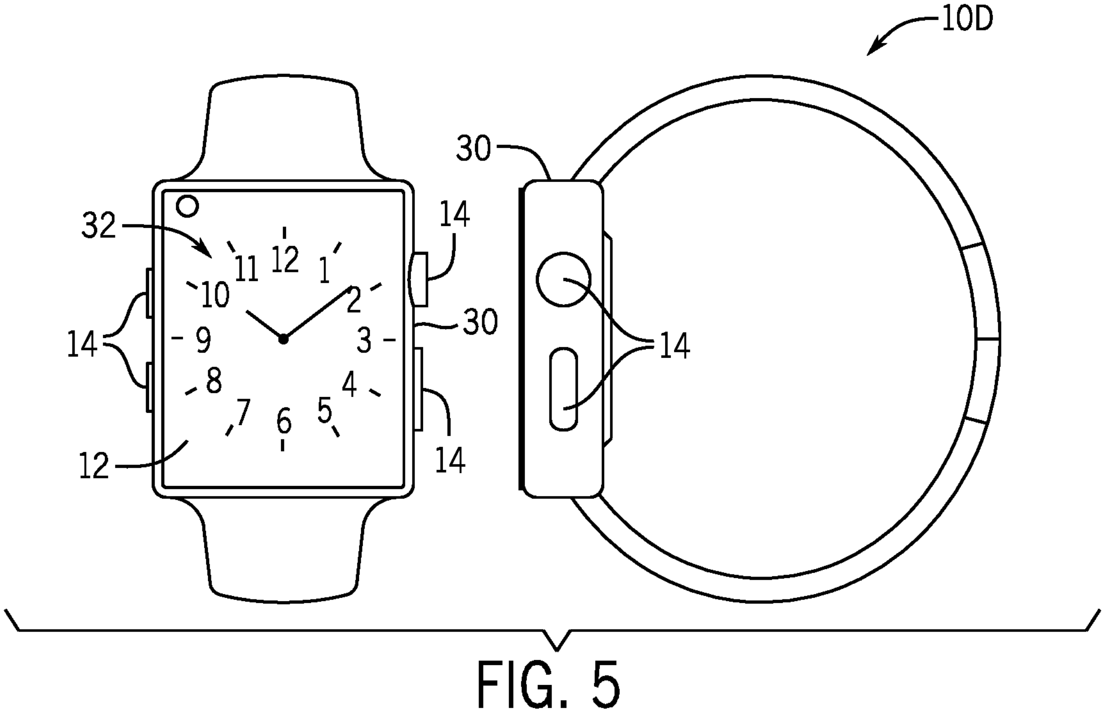
FIG. 5 are front and side views of a watch representing an example of the electronic device of FIG. 1, in accordance with an embodiment.

Another example of a suitable electronic device 10, specifically a tablet device is shown in FIG. 3. The tablet device 10B may be any IPAD® model available from Apple Inc. A further example of a suitable electronic device 10, specifically a computer is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
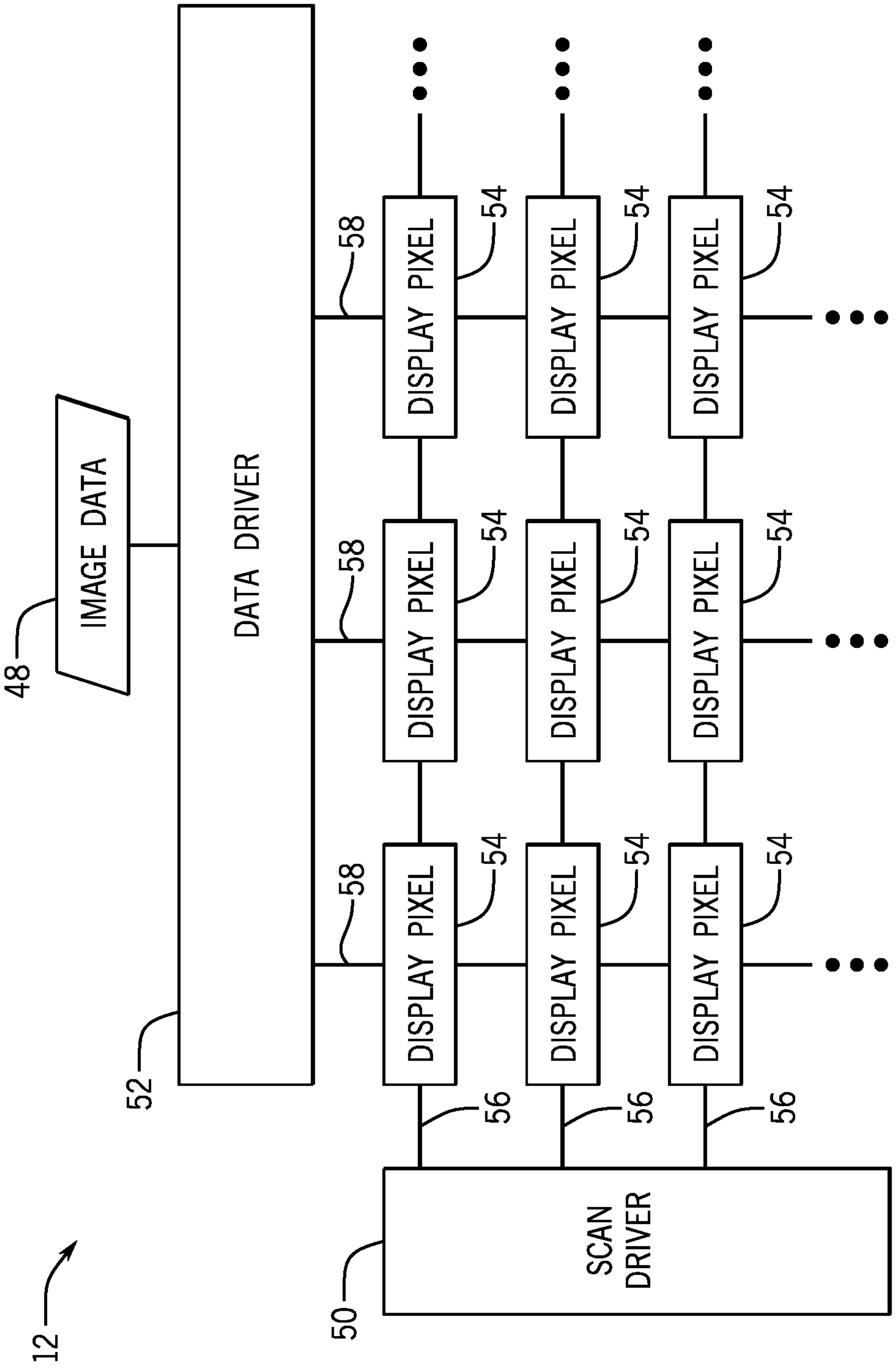
FIG. 6 is a block diagram of an electronic display of the electronic device, in accordance with an embodiment.

As shown in FIG. 6, the electronic display 12 may receive image data 48 for display on the electronic display 12. The electronic display 12 includes display driver circuitry that includes scan driver circuitry 50 and data driver circuitry 52 that can program the image data 48 onto display pixels 54. The display pixels 54 may each contain one or more self-emissive elements, such as a light-emitting diodes (LEDs) (e.g., organic light emitting diodes (OLEDs) or micro-LEDs (μLEDs)). Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), or others.

The scan driver 50 may provide scan signals (e.g., pixel reset, data enable, on-bias stress) on scan lines 56 to control the display pixels 54 by row. For example, the scan driver 50 may cause a row of the display pixels 54 to become enabled to receive a portion of the image data 48 from data lines 58 from the data driver 52. In this way, an image frame of image data 48 may be programmed onto the display pixels 54 row by row. Other examples of the electronic display 12 may program the display pixels 54 in groups other than by row.

Figure 7:
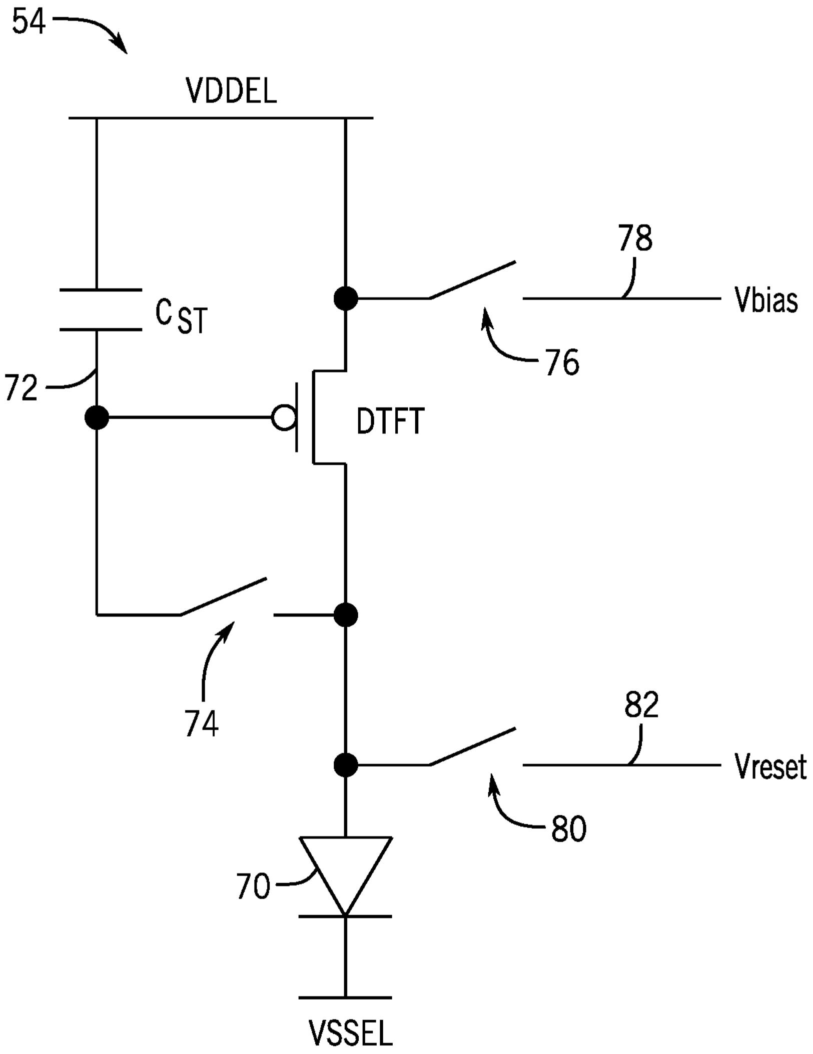
FIG. 7 is a circuit diagram of a display pixel of the electronic display, in accordance with an embodiment.

The display pixels 54 may use any suitable circuitry. A simplified example of a display pixel 54 appears in FIG. 7. The display pixel 54 of FIG. 7 includes an organic light emitting diode (OLED) 70 that emits an amount of light that varies depending on the electrical current through the OLED 70. A driving transistor DTFT provides this electrical current. The electrical current thus varies depending on a programming voltage at a node 72 stored in a storage capacitor $C_{ST}$. The programming voltage at the node 72 is based on the image data and is applied to a gate of the driving transistor DTFT. This causes the driving transistor DTFT to permit a particular amount of current to flow from a positive electroluminance supply voltage VDDEL and a negative electroluminance supply voltage VSSEL through the OLED 70. In this way, the image data 48 may be programmed into the display pixel 54. Before continuing, it is noted that the driving transistor DTFT appears in FIG. 7 as a low-temperature polysilicon (LTPS) PMOS transistor. However, the driving transistor DTFT may take any suitable form, such as an LTPS or LTPO PMOS, NMOS, or CMOS transistor.

The programming voltage may be stored onto the storage capacitor CST through a switch 74 that may be selectively opened and closed. The switch 74 is closed during programming at the start of an image frame to allow the programming voltage to be stored in the storage capacitor CST. After the programming voltage to be stored in the storage capacitor CST, the switch 74 may be opened. The switch 74 thus may represent any suitable transistor (e.g., an LTPS or LTPO transistor) with sufficiently low leakage to sustain the programming at the lowest refresh rate used by the electronic display 12. A switch 76 may selectively provide a bias voltage Vbias from a first bias voltage supply 78. A switch 80 may selectively provide an anode reset voltage Vreset through a second voltage supply 82. The switches 76 and 80 may likewise take the form of any suitable transistors (e.g., LTPS or LTPO PMOS, NMOS, or CMOS transistors).

The voltage Vreset is related to the turn on voltage for the OLED 70. OLEDs generally have a slow charging regime when turned on (e.g., at low gray levels), and Vreset is used to improve the charging process in the OLED. Since temperatures affect the pixel driver current, OLED efficiency, OLED current and voltage shifts, etc., the turn on voltage changes with temperature. For example, the turn on voltage decreases with higher temperatures for a fixed current through the OLED 70, as will be illustrated in FIG. 11.

Figure 8:
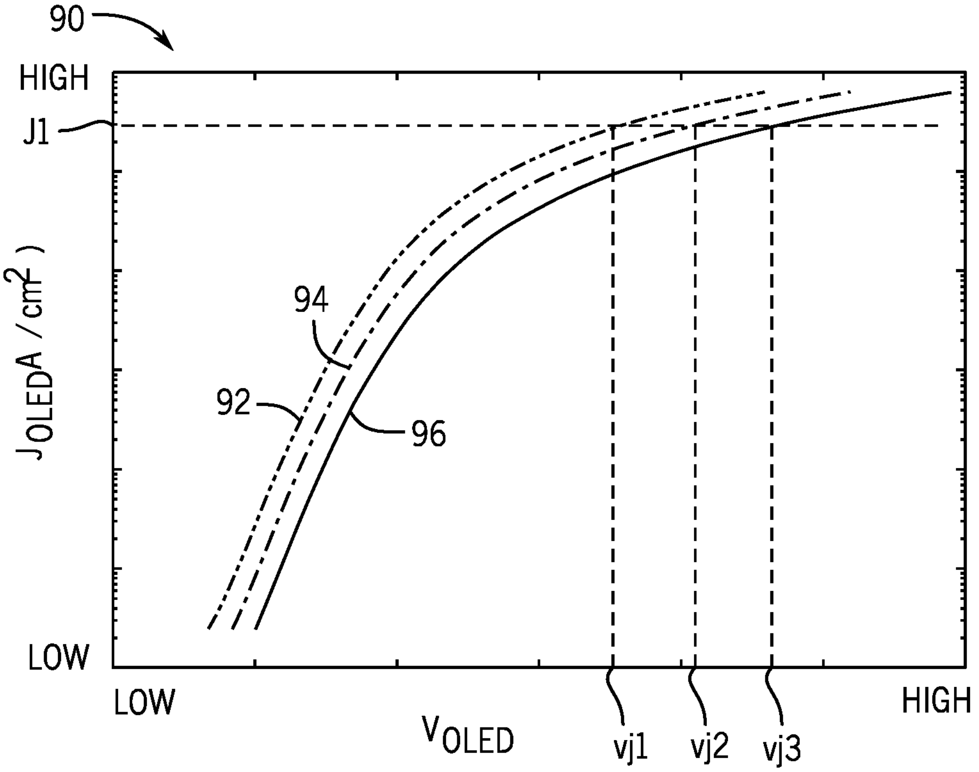
FIG. 8 is a plot showing example characteristics of an electronic display of the electronic device, in accordance with an embodiment.

FIG. 8 illustrates a plot 90 showing that, for the same electric current density of an OLED (JOLED) J1, a voltage of the OLED (VOLED) may have different values at different temperatures. Here, JOLED is associated with the electrical current density through the OLED 70, and VOLED is associated with the electrical voltage across the OLED 70. A curve 92 illustrates a relationship between the VOLED and the JOLED at a temperature T1, a curve 94 illustrates a relationship between the VOLED and the JOLED at a temperature T2, and a curve 96 illustrates a relationship between the VOLED and the JOLED at a temperature T3. In the illustrated embodiment, the temperature T1 is higher than the temperature T2, and the temperature T2 is higher than the temperature T3. At a certain value J1 of the JOLED, VOLED corresponds to different values Vj1, Vj2, and Vj3 on the curves 92, 94, and 96, respectively. In the illustrated diagram, the value Vj1 is smaller than Vj2, and Vj2 is smaller than Vj3. That is, at higher temperatures, for the same current through the OLED (i.e., a same brightness level), a lower VOLED may be needed, which may improve gray level accuracy and save power, as will be illustrated in FIG. 10.

Figure 9:
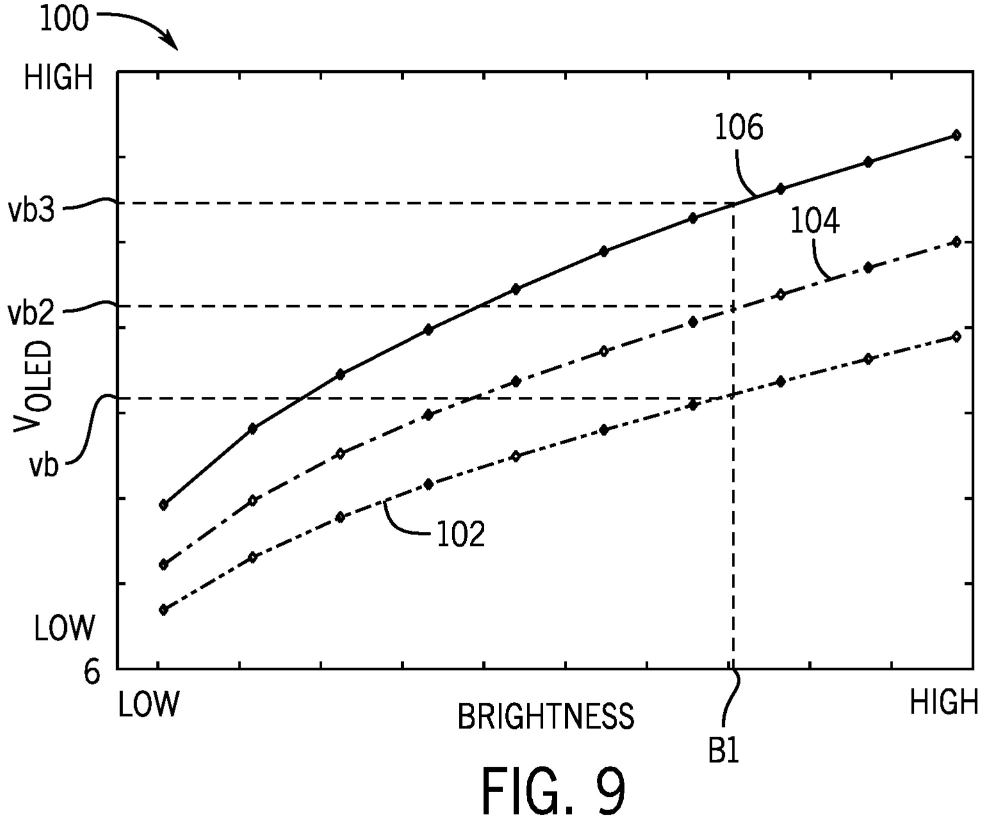
FIG. 9 is a plot showing example characteristics of an electronic display of the electronic device, in accordance with an embodiment.

FIG. 9 illustrates plot 100 showing that, for a same brightness, the VOLED voltage may have different values at different temperatures. A curve 102 illustrates a relationship between the VOLED and a brightness of the OLED 70 at the temperature T1, a curve 104 illustrates a relationship between the VOLED and the brightness of the OLED 70 at the temperature T2, and a curve 106 illustrates a relationship between the VOLED and the brightness of the OLED 70 at the temperature T3. In the example of FIG. 9, the temperature T1 is higher than the temperature T2, and the temperature T2 is higher than the temperature T3. At a certain brightness Bl, VOLED corresponds to different values Vb1, Vb2, and Vb3 on the curves 102, 104, and 106, respectively. In the illustrated example, the value Vb1 is smaller than Vb2, and Vb2 is smaller than Vb3. That is, at higher temperatures, for the same brightness of the OLED, a lower VOLED may be used, which may save power, as will be illustrated in FIG. 10.

Figure 10:
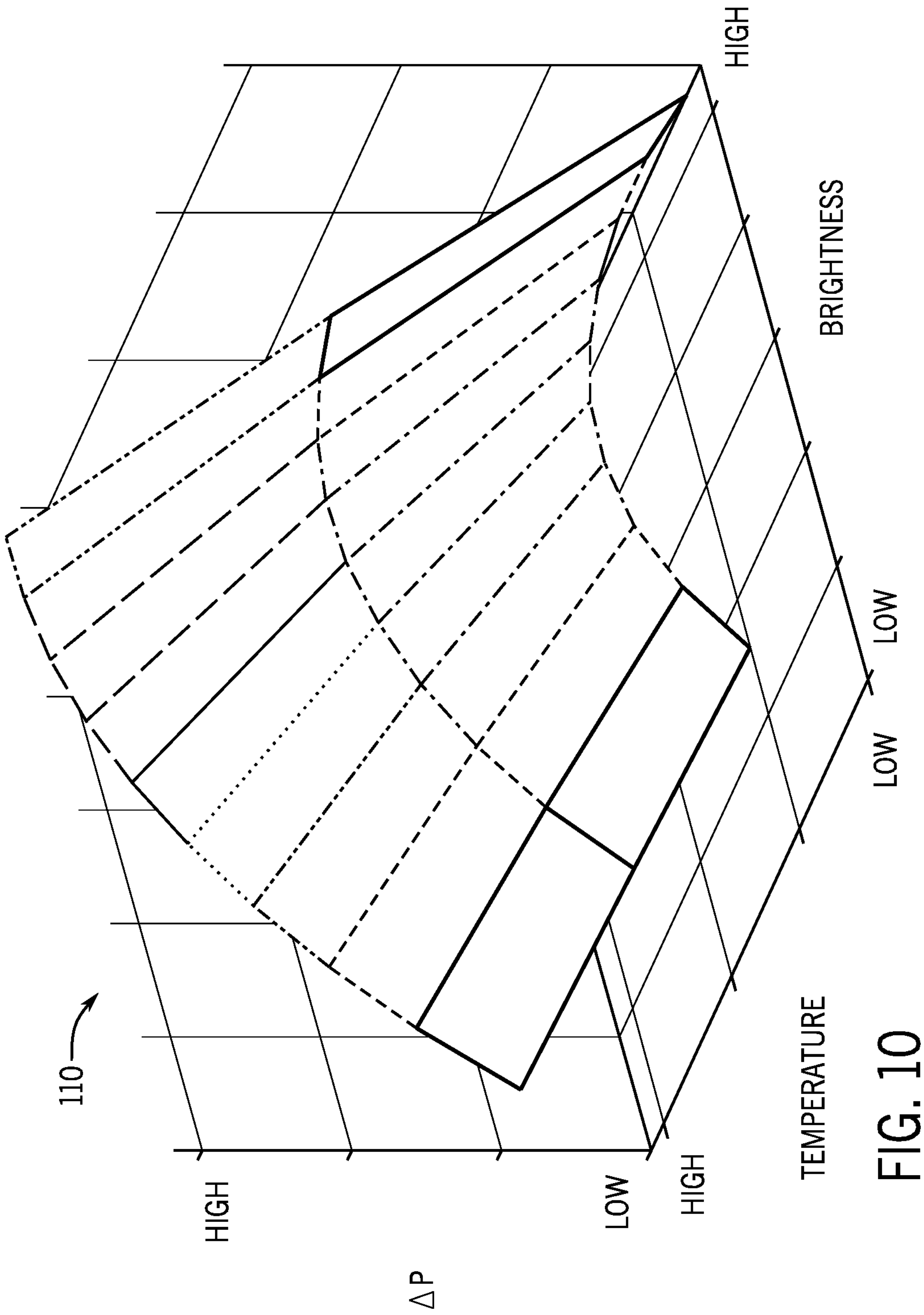
FIG. 10 is a diagram illustrating power saving by VSSEL tuning for different characteristics of the electronic display, in accordance with an embodiment.

FIG. 10 shows an example diagram 110, which illustrates power saving (ΔP) by VSSEL tuning with respect to brightness and temperature. The diagram 110 illustrates that higher power saving may be achieved at higher temperatures and/or higher brightness values by performing VSSEL tuning.

Figure 11:
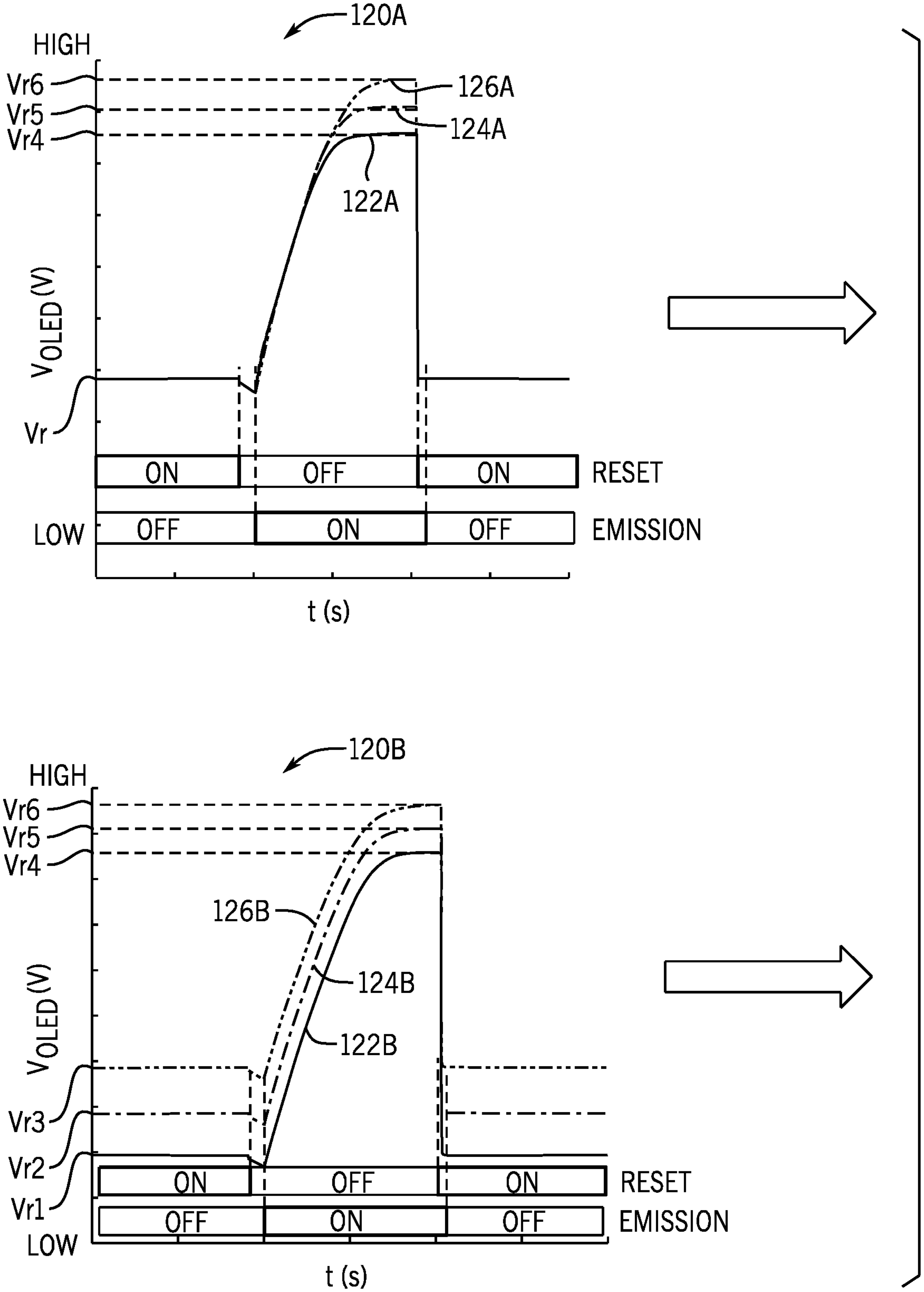
FIG. 11 is a timing diagram for providing Vreset to display pixels of the electronic display, in accordance with an embodiment.

FIG. 11 shows a timing diagram 120A, which illustrates fixed Vreset with respect to temperatures, and a timing diagram 120B, which illustrates Vreset tuning with respect to temperature. In the diagram 120A, a curve 122A illustrates a relationship between the VOLED and the Vreset of the OLED 70 at the temperature T1, a curve 124A illustrates a relationship between the VOLED and the Vreset of the OLED 70 at the temperature T2, and a curve 126A illustrates a relationship between the VOLED and the Vreset of the OLED 70 at the temperature T3. In the illustrated embodiment, the temperature T1 is higher than the temperature T2, and the temperature T2 is higher than the temperature T3. Before the light emission that occurs when the OLED 70 is turned on, Vreset is on and VOLED has a fixed value Vr for different temperatures corresponding to the curves 122A, 124A, and 126A, respectively. After the light emission begins as the OLED 70 is turned on and the intensity of the resulting light pulse is stabilized at a certain gray level (e.g., achieves a settled current density JOLED through the OLED 70), the VOLED may have different values Vr4, Vr5, and Vr6 for the same value of the current density JOLED (as illustrated in FIG. 8) at different temperatures corresponding to the curves 122A, 124A, and 126A, respectively. In the illustrated diagram, the value of Vr4 is smaller than Vr5, and Vr5 is smaller than Vr6.

In the diagram 120B, by contrast, the Vreset voltage uses different values at different temperatures. A curve 122B illustrates a relationship between the VOLED and the Vreset of the OLED 70 at the temperature T1, a curve 124B illustrates a relationship between the VOLED and the Vreset of the OLED 70 at the temperature T2, and a curve 126B illustrates a relationship between the VOLED and the Vreset of the OLED 70 at the temperature T3. In the illustrated diagram, the temperature T1 is higher than the temperature T2, and the temperature T2 is higher than the temperature T3. Before the light emission begins as the OLED 70 is turned on, the Vreset is on and has different values at different temperatures corresponding to the curves 122B, 124B, and 126B, respectively; accordingly, the VOLED has different values Vr1, Vr2, and Vr3 at different temperatures corresponding to the curves 122B, 124B, and 126B, respectively. After the light emission begins as the OLED 70 is turned on and the intensity of the resulting light pulse is stabilized at a certain gray level (e.g., achieves a settled current density JOLED through the OLED 70), the VOLED may have different values Vr4, Vr5, and Vr6 for a same value of the current density JOLED (as illustrated in FIG. 8) at different temperatures, corresponding to the curves 122B, 124B, and 126B, respectively. In the illustrated diagram, the value Vr1 is smaller than Vr2, and Vr2 is smaller than Vr3; Vr4 is smaller than Vr5, and Vr5 is smaller than Vr6. That is, at higher temperatures, a lower Vreset voltage may be used to obtain the same gray level light emission, which may improve light pulse accuracy at low gray levels, as will be illustrated in FIG. 12.

Figure 12:
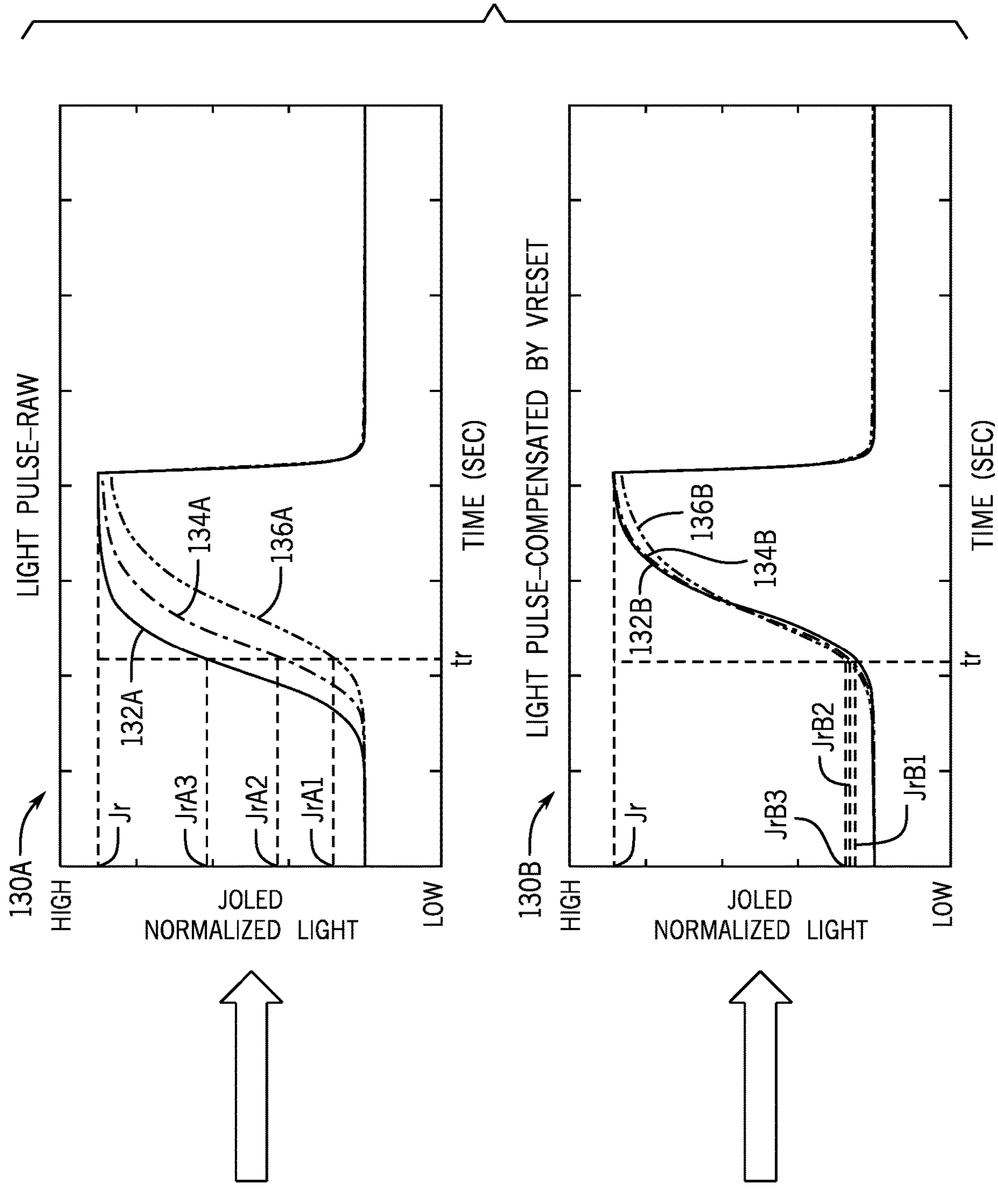
FIG. 12 is a timing diagram showing light pulse characteristics affected by Vreset, in accordance with an embodiment.

FIG. 12 shows a timing diagram 130A, which illustrates a light pulse without using Vreset tuning, and a timing diagram 130B, which illustrates a light pulse compensated by Vreset tuning with respect to temperature. In diagram 130A, a curve 132A illustrates a relationship between the current density JOLED and the time during the light pulse of the OLED 70 at the temperature T1, a curve 134A illustrates a relationship between the current density JOLED and the time during the light pulse of the OLED 70 at the temperature T2, and a curve 136A illustrates a relationship between the current density JOLED and the time during the light pulse of the OLED 70 at the temperature T3. In the illustrated diagram, the temperature T1 is higher than the temperature T2, and the temperature T2 is higher than the temperature T3. Before the light emission of the OLED 70 is turned on, the Vreset is on and the VOLED has the fixed value Vr at different temperatures (as illustrated in diagram 120A). After the light emission begins as the OLED 70 is turned on and before the intensity of the resulting light pulse is stabilized at a gray level Jr (e.g., achieves a settled current through the OLED 70), the current density JOLED may have different values JrA3, JrA2, and JrA1 at a time tr for the curves 132A, 134A, and 136A corresponding to different temperatures, respectively. Accordingly, the light emitted from the OLED 70 may erroneously correspond different gray levels, corresponding to different current values JrA3, JrA2, and JrA1, at the time tr at different temperatures.

Diagram 130B illustrates a light pulse compensated by Vreset tuning with respect to temperature. In diagram 130B, a curve 132B illustrates a relationship between the current density JOLED and the time during the light pulse of the OLED 70 at the temperature T1, a curve 134B illustrates a relationship between the current density JOLED and the time during the light pulse of the OLED 70 at the temperature T2, and a curve 136B illustrates a relationship between the current density JOLED and the time during the light pulse of the OLED 70 at the temperature T3. In the illustrated diagram, the temperature T1 is higher than the temperature T2, and the temperature T2 is higher than the temperature T3. Before the light emission of the OLED 70 is turned on, the Vreset is on and the VOLED has different values Vr1, Vr2, and Vr3 at different temperatures T1, T2, and T3, respectively (as illustrated in diagram 120B). After the light emission begins as the OLED 70 is turned on and before the intensity of the resulting light pulse is stabilized at the gray level Jr (e.g., achieves a settled current through the OLED 70), the JOLED may have different values JrB3, JrB2, and JrB1 at the time tr for the curves 132B, 134B, and 136B corresponding to different temperatures, respectively. Since the turn on voltage decreases with higher temperatures (as illustrated in diagram 120B), the differences among the values of JrB3, JrB2, and JrB1 are significantly reduced by using Vreset tuning with respect to temperature when compared to the differences among the values of JrA3, JrA2, and JrA1 in diagram 130A, thereby increasing the accuracy at low gray levels despite changes in temperature.

Figure 13:
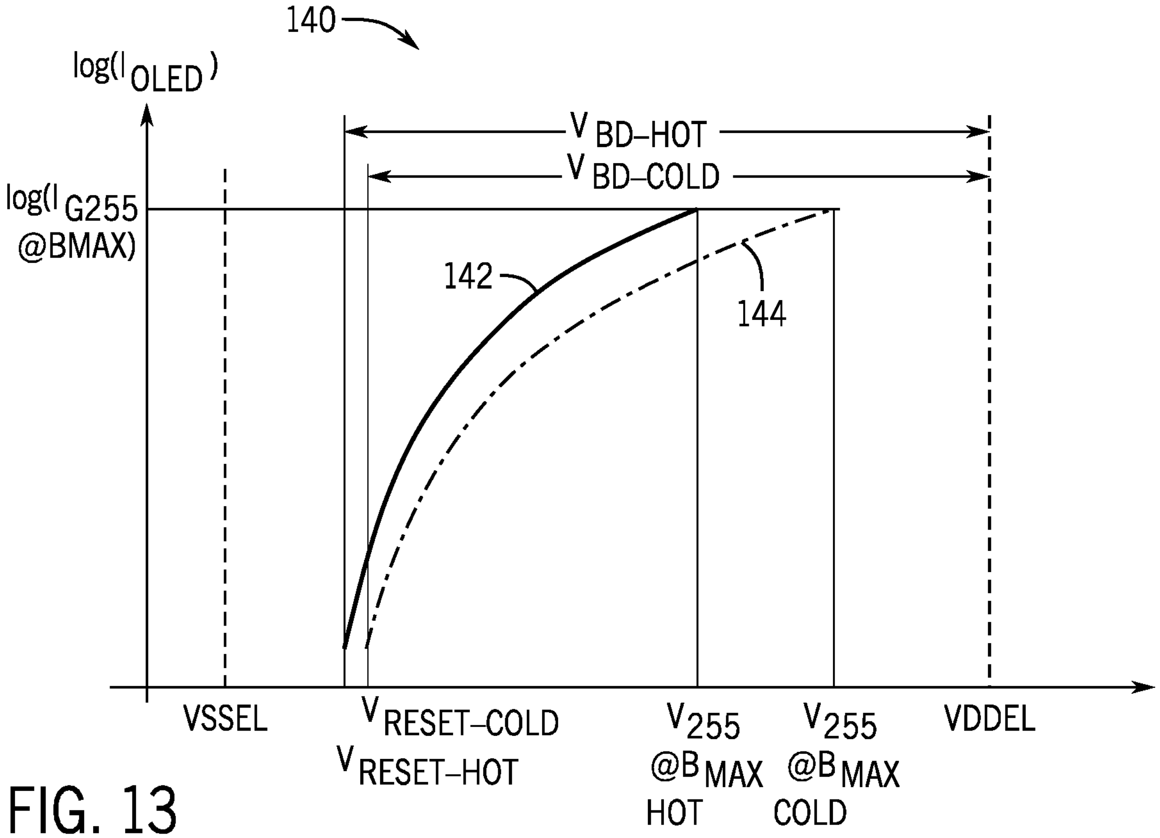
FIG. 13 is a plot showing example characteristics for an electronic display of the electronic device without VSSEL and Vreset tuning, in accordance with an embodiment.

FIG. 13 illustrates a plot 140 without VSSEL and Vreset tuning, in which the voltage VOLED has different values at different temperatures for a brightness associated with a value of a current IOLED through the OLED 70. A curve 142 illustrates a relationship between the brightness (associated with log(IOLED)) of the OLED 70 and the VOLED at the temperature T1 and a curve 144 illustrates a relationship between the brightness (associated with log(IOLED)) of the OLED 70 and the VOLED at the temperature T2. In the plot 140, the temperature T1 is higher than the temperature T2. As discussed above, the voltage Vreset decreases with higher temperatures for a fixed current through the OLED 70. In FIG. 13, VSSEL and Vreset (both VRESET-HOT for the curve 142 and VRESET-COLD for the curve 144) have negative values, and VDDEL has a positive value. For a given brightness level, VOLED has smaller values at higher temperatures. For example, the difference between VSSEL and $V_{RESET\text{-}HOT}$ is smaller than the difference between VSSEL and VRESET-COLD, and the difference between VSSEL and $V_{255@Bmax\text{-}Hot}$ (e.g., the voltage at the maximum brightness value of gray level 255 at high temperature for curve 142) is smaller than the difference between the VSSEL and the $V_{255@Bmax\text{-}Cold}$ (e.g., the voltage at the maximum brightness value of gray level 255 at low temperature for curve 144), as shown by curve 142 and curve 144. Accordingly, the difference $V_{BD\text{-}HOT}$ between the VDDEL and the $V_{255\ @Bmax\text{-}Hot}$ is bigger than the difference $V_{BD\text{-}COLD}$ between the VDDEL and the $V_{255\ @Bmax\text{-}Cold}$. In addition, the difference between VRESET-HOT and $V_{255\ @Bmax\text{-}Hot}$ is smaller than the difference between the VRESET-COLD and $V_{255\ @Bmax\text{-}Cold}$. Indeed, as illustrated in FIG. 13, at the same brightness level, VOLED has different values at different temperatures. For example, at the maximum brightness level, $V_{255\ @Bmax\text{-}Hot}$ at the temperature T1 is smaller than $V_{255@Bmax\text{-}Cold}$ at the temperature T2, and the temperature T1 is higher than T2.

Figure 14:
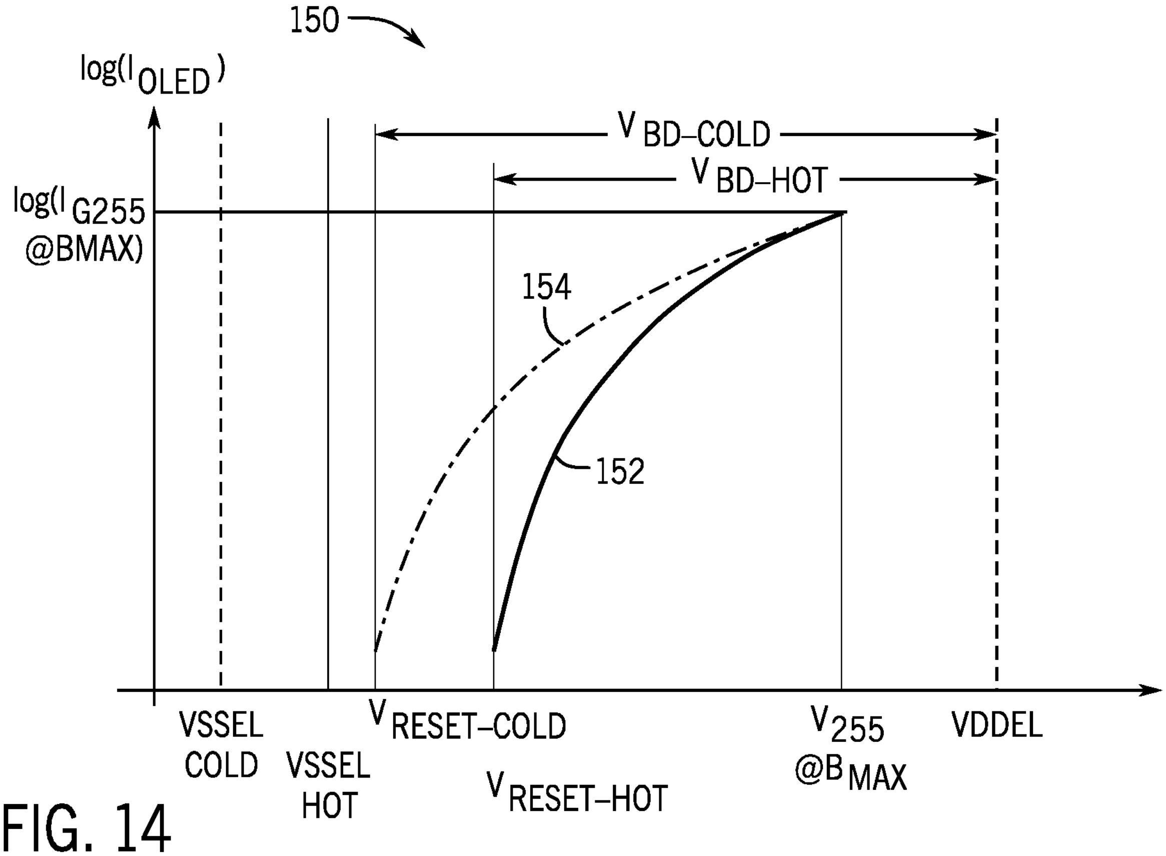
FIG. 14 is a plot showing example characteristics for an electronic display of the electronic device with VSSEL and Vreset tuning, in accordance with an embodiment.

FIG. 14 illustrates a timing diagram 150 when VSSEL and Vreset tuning are performed. A curve 152 illustrates a relationship between the brightness (associated with log (IOLED)) of the OLED 70 and the VOLED at the temperature T1 and a curve 154 illustrates a relationship between the brightness (associated with log(IOLED)) of the OLED 70 and the VOLED at the temperature T2. In the illustrated embodiment, the temperature T1 is higher than the temperature T2. As discussed above, the turn on voltage for the OLED 70 decreases with higher temperatures for a fixed current through the OLED 70. In FIG. 14, the VSSEL and the Vreset (both the $V_{RESET\text{-}HOT}$ for the curve 152 and the VRESET-COLD for the curve 154) have negative values, and VDDEL has a positive value. In FIG. 14, both VSSEL and the Vreset are adjusted corresponding to the temperature (e.g., the $VSSEL_{HOT}$ and the $V_{RESET\text{-}HOT}$ for the curve 152 and the $VSSEL_{COLD}$ and the VRESET-COLD for the curve 154) so that the voltage at the maximum brightness value of gray level 255 at high temperature T1 for curve 152 has the same value $V_{255@Bmax}$ as the voltage at the maximum brightness value of gray level 255 at low temperature T2 for curve 154, as will be illustrated in FIG. 15. As described above, tuning VSSEL and Vreset with respect to temperature may improve the gray level accuracy and save power.

Figure 15:
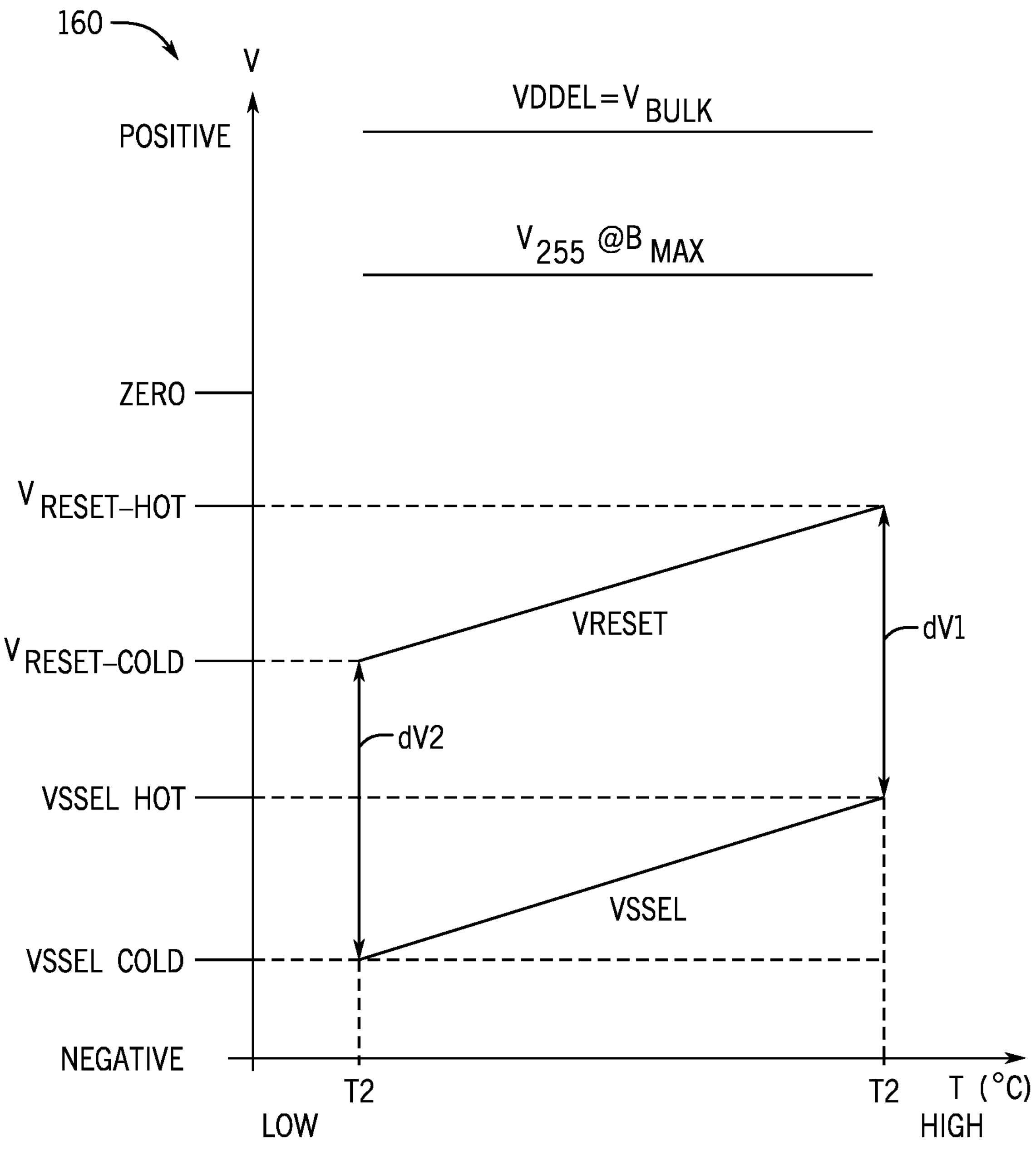
FIG. 15 is a plot showing example characteristics for an electronic display of the electronic device with VSSEL and Vreset tuning, in accordance with an embodiment.

FIG. 15 illustrates a plot 160 showing the effect of VSSEL and Vreset tuning with respect to temperature. In FIG. 15, VSSEL and Vreset have negative values, and VDDEL has a positive value. In the plot 160, both VSSEL and Vreset are adjusted corresponding to the temperature. For example, VSSEL and Vreset have values of $VSSEL_{HOT}$ and $V_{RESET-HOT}$ at T1 and $VSSEL_{COLD}$ and VRESET-COLD at T2. In FIG. 15, the voltage at the maximum brightness value of gray level 255 at high temperature T1 has the same value $V_{255@Bmax}$ as the voltage at the maximum brightness value of gray level 255 at low temperature T2. In addition, the difference dV2 between the value of $VSSEL_{COLD}$ and the VRESET-COLD at T2 is bigger than the difference dV1 between the value of $VSSEL_{HOT}$ and the $V_{RESET-HOT}$ at T1. The VSSEL and Vreset voltages with respect to temperature may be stored in a lookup table on a display driver integrated circuit (DIC). The lookup table may take any suitable form.

Figure 16:
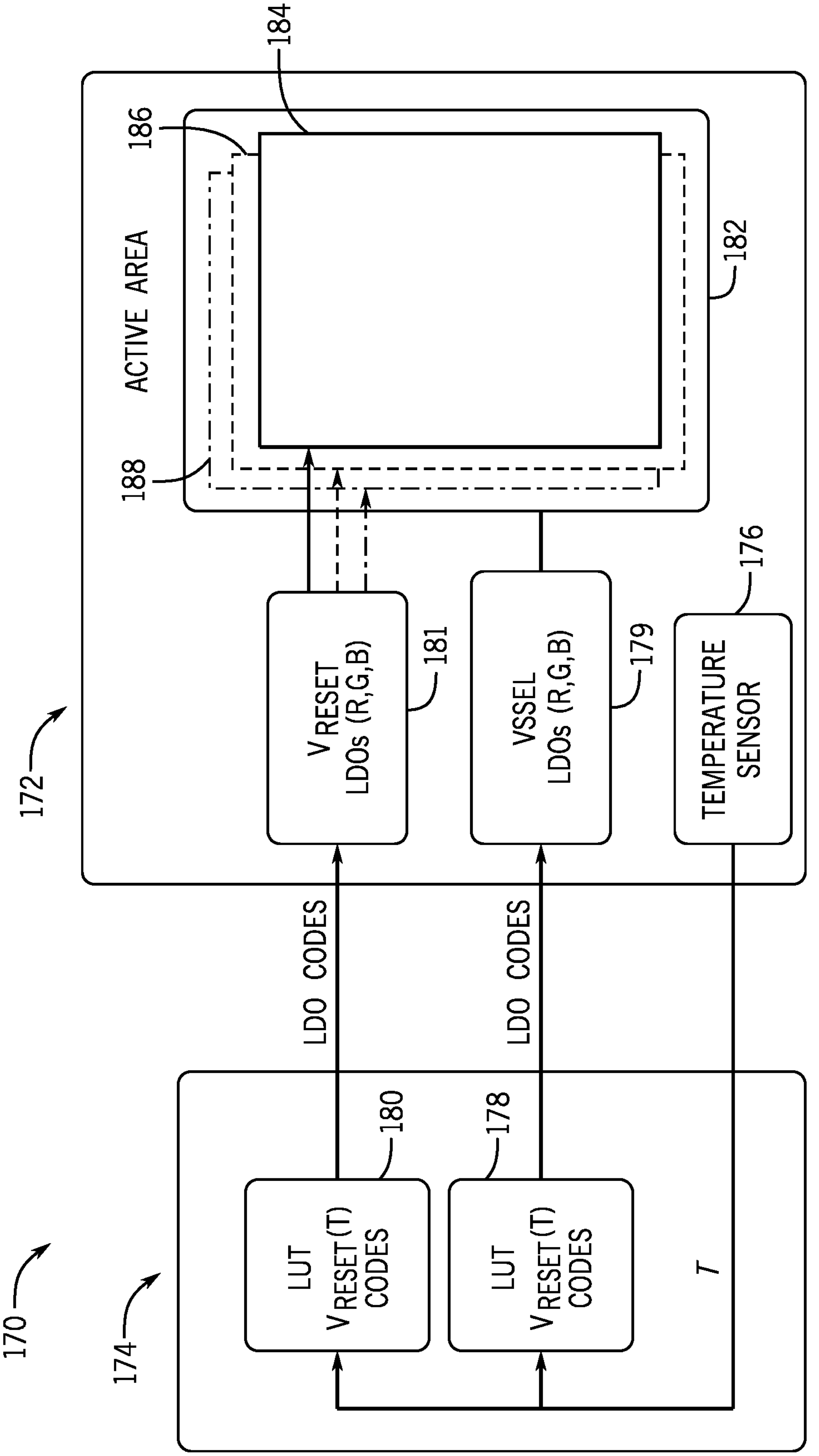
FIG. 16 is block diagram of an electronic display of the electronic device implementing VSSEL and Vreset tuning, in accordance with an embodiment.
Figure 17:
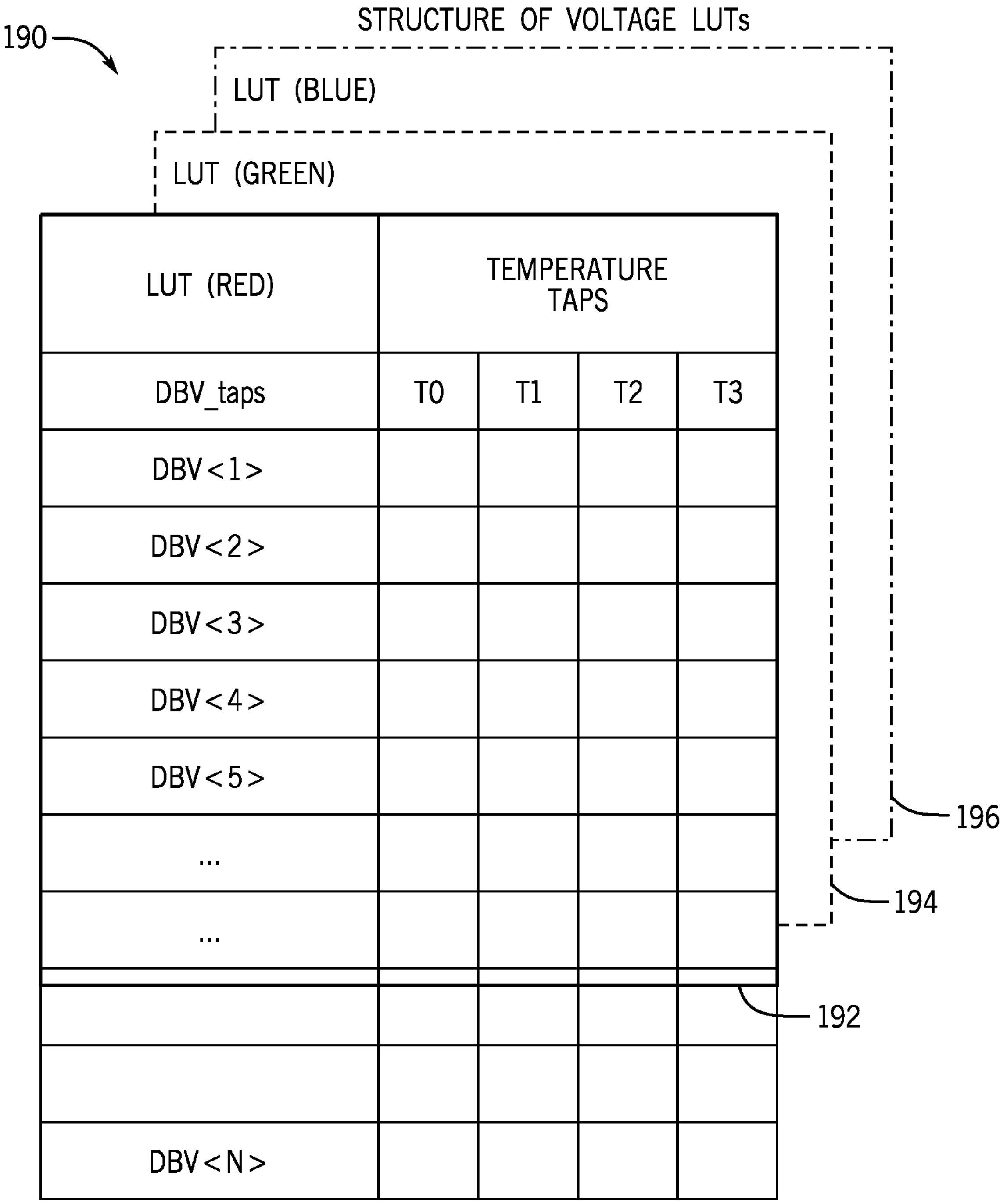
FIG. 17 is a block diagram of voltage look up tables (LUTs) to implement VSSEL and Vreset tuning, in accordance with an embodiment.

FIG. 16 illustrates an embodiment for an electronic display 170 of an electronic device implementing VSSEL and Vreset tuning. The electronic display 170 has a display panel 172 and a control circuit 174. A temperature sensor 176 is used to measure a temperature T of the area of the display panel 172 and transmit temperature data to the control circuit 174. The control circuit 174 is configured to adjust the supply voltage VSSEL and the voltage Vreset based on the temperature data received from the temperature sensor 176. In one embodiment, the control circuit 174 may obtain the dynamic supply voltage VSSEL(T) and the dynamic voltage VRESET (T) for the temperature T from a lookup table 178 and 180, respectively. The lookup tables 178 and 180 (e.g., as illustrated in FIG. 17) may include voltage data for display pixels associated with different colors (e.g., red (R), green (G), and blue (B)), which may be transmitted to corresponding Low Dropout Linear Regulators, VSSEL-LDOs (R,G,B) 179 and $V_{RESET}$-LDOs (R,G,B) 181, respectively. The VSSEL-LDOs (R,G,B) 179 may output a corresponding regulated value of VSSEL(T) to an active area 182 on the display panel 172. The $V_{RESET}$-LDOs (R,G,B) 181 may output regulated voltage data VRESET (T) associated with different colors to corresponding driving circuits 184 (red), 186 (green), and 188 (blue) on the active area 182, respectively.

FIG. 17 illustrates an embodiment of a structure 190 of voltage lookup tables for storing voltage data for display pixels associated with different colors, e.g., red (R), green (G), and blue (B), with respect to temperature and brightness. The structure 190 may include a lookup table 192 for storing voltage data for display pixels associated with red color, a lookup table 194 for storing voltage data for display pixels associated with green color, and a lookup table 196 for storing voltage data for display pixels associated with blue color. Each lookup table may be a two-dimensional lookup table that receives a current global brightness setting (e.g., display brightness value (DBV) taps such as DBV<1>, DBV<2>, DBV<3> . . . DBV<N>) and a current display panel temperature (e.g., temperature taps such as TO, T1, T2, T3) and outputs associated voltages (e.g., VSSEL and/or Vreset) for those conditions.

Figure 18:
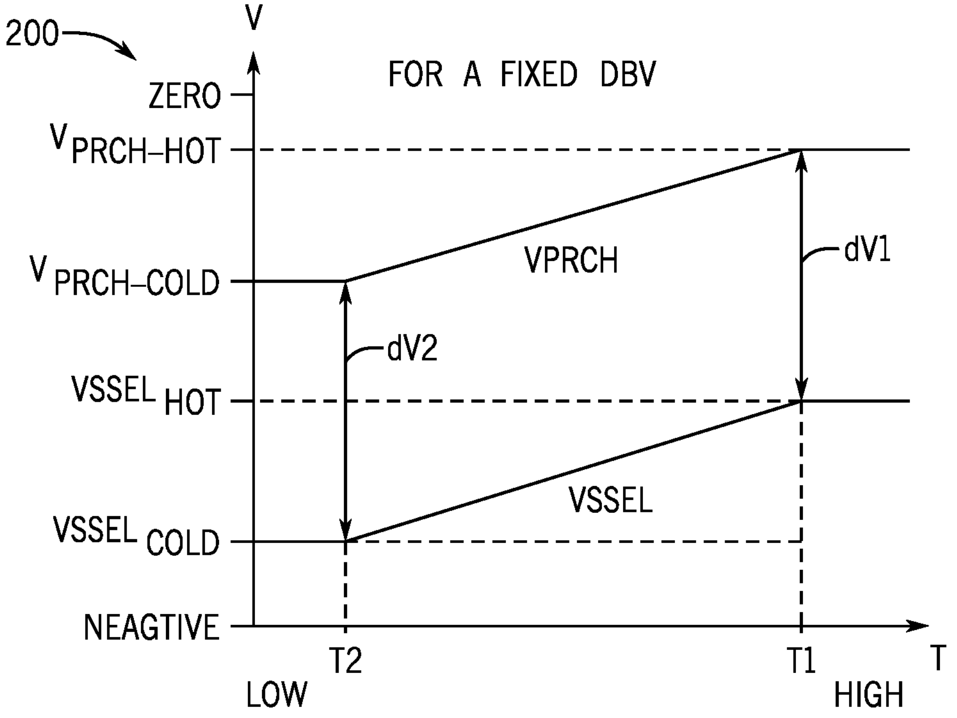
FIG. 18 is a plot showing example characteristics for an electronic display of the electronic device with VSSEL and precharge voltage ($V_{PRCH}$) tuning for changes in temperature (T) with a fixed global display brightness value (DBV), in accordance with an embodiment.

FIG. 18 illustrates a plot 200 showing the effect of VSSEL and precharge voltage ($V_{PRCH}$) tuning with respect to temperature for a fixed brightness (e.g., a fixed DBV). In FIG. 18, VSSEL and $V_{PRCH}$ have negative values. In the plot 200, both VSSEL and $V_{PRCH}$ are adjusted corresponding to the temperature (e.g., VSSEL and $V_{PRCH}$ have values of $VSSEL_{HOT}$ and $V_{PRCH-HOT}$ at T1 and $VSSEL_{COLD}$ and $V_{PRCH-COLD}$ at T2). In FIG. 18, the difference $dV_2$ between the value of $VSSEL_{COLD}$ and $V_{PRCH-COLD}$ at T2 is bigger than the difference $dV_1$ between the value of $VSSEL_{HOT}$ and $V_{PRCH-HOT}$ at T1. The VSSEL and $V_{PRCH}$ voltages with respect to temperatures may be stored in a lookup table on a display driver integrated circuit (DIC). The lookup table may take any suitable form (e.g., as illustrated in FIG. 17).

Figure 19:
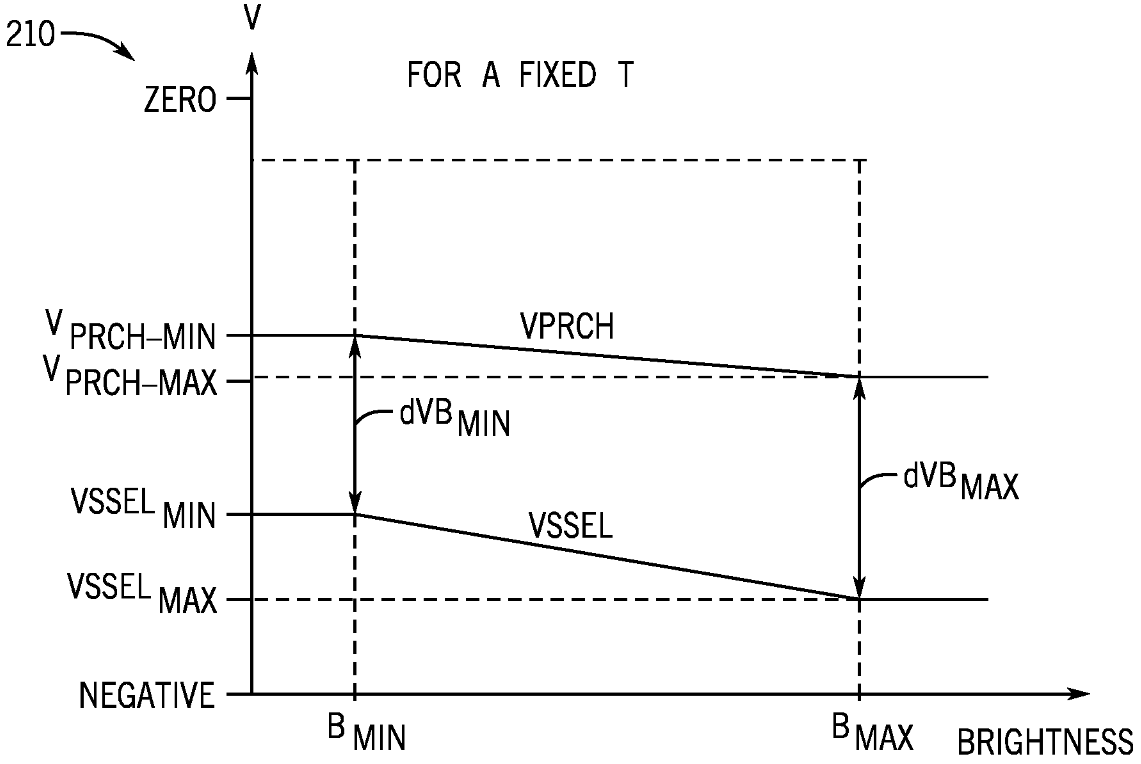
FIG. 19 is a plot showing example characteristics for an electronic display of the electronic device with VSSEL and $V_{PRCH}$ tuning for changes in global display brightness value (DBV) with a fixed temperature (T), in accordance with an embodiment.

FIG. 19 illustrates a plot diagram 210 showing the effect of VSSEL and $V_{PRCH}$ tuning with respect to brightness for a fixed temperature. In FIG. 19, the VSSEL and the $V_{PRCH}$ have negative values. In diagram 210, both VSSEL and the $V_{PRCH}$ are adjusted corresponding to the brightness (e.g., VSSEL and $V_{PRCH}$ have values of $VSSEL_{MAX}$ and $V_{PRCH-Max}$ at Bmax and $VSSEL_{MIN}$ and $V_{PRCH-MIN}$ at Bmin). In FIG. 19, the difference dVBmin between the value of VSSEL MIN and $V_{PRCH-MIN}$ at Bmin is smaller than the difference dVBmax between the value of $VSSEL_{MAX}$ and $V_{PRCH-Max}$ at Bmax. The VSSEL and $V_{PRCH}$ voltages with respect to brightness may be stored in a lookup table on a display driver integrated circuit (DIC). The lookup table may take any suitable form (e.g., as illustrated in FIG. 17).

Figure 20:
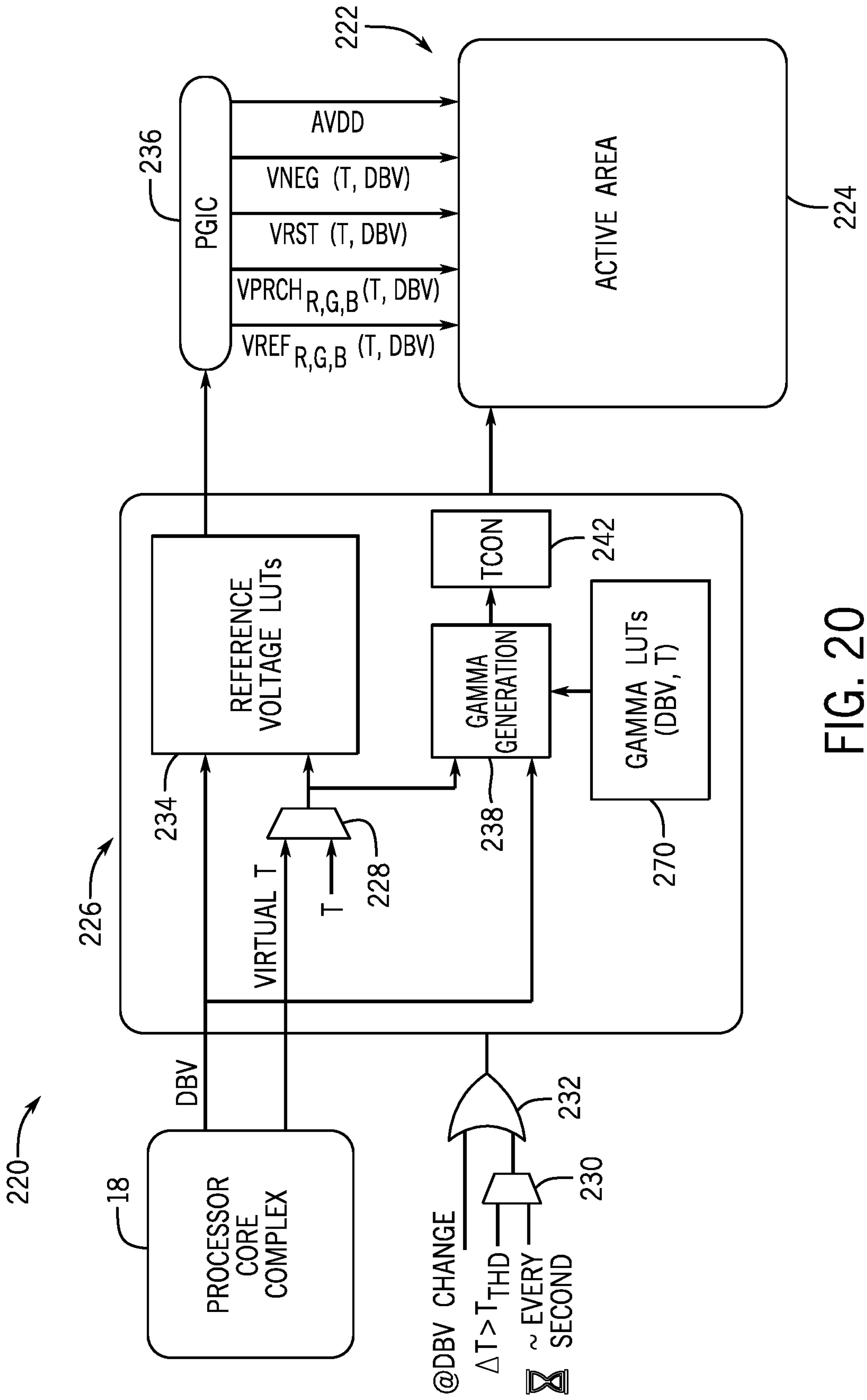
FIG. 20 is a schematic block diagram of circuitry for implementing VSSEL and VPRCH tuning for an electronic display of the electronic device, in accordance with an embodiment.

FIG. 20 illustrates a schematic block diagram 220 for implementing VSSEL and $V_{PRCH}$ tuning for an electronic display 222 of an electronic device. The electronic display 220 has an active area 224 with display pixels associated driving circuitry and a control circuit 226. The control circuit 226 adjusts various voltages (e.g., VSSEL, Vreset, $V_{PRCH}$) based on temperature data and brightness data received from the processor core complex 18. The temperature data received by the control circuit 226 may be selected, via a multiplexer 228, from a virtual temperature data calculated by the processor core complex 18 and sensor data obtained from temperature sensors installed on the active area 224. The control circuit 226 may be triggered by a DBV change in the active area 224, or a temperature change in the active area 224 being more than a threshold, or a fixed time period (e.g., every second) for a routine tuning, via a multiplexer 230 and an OR gate 232. In one embodiment, the control circuit 226 may obtain the value of various voltages from lookup tables 234 and transmit the various voltage values to a PGIC 236 (programmable integrated circuit). The PGIC 236 may transmit corresponding voltage values (e.g., VREF, VPRCH, VRST, VNEG, AVDD) to corresponding circuits in the active area 224. The control circuit 226 may generate gamma correction by using a gamma generation circuit 238 based on a gamma lookup table 240. The generated gamma correction may be transmitted to a timing controller (TCON) 242, which may input the generated gamma correction into the active area 224 for displaying image with the corresponding voltage values received from the PGIC 236. By tuning the VSSEL and the Vreset/$V_{PRCH}$ voltages, the gray level accuracy may be improved, especially at the low gray levels. Dynamic tuning of the VSSEL and the Vreset/$V_{PRCH}$ voltages may also save power.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic display device, comprising:

one or more self-emissive pixels comprising respective light-emitting elements;

a temperature sensor configured to determine a temperature of the electronic display device; and a control circuit configured to cause different values of a reset voltage to be supplied to the one or more self-emissive pixels based at least in part on the temperature, wherein the reset voltage comprises a precharge voltage applied to the respective light-emitting elements, wherein the precharge voltage has a value higher than a source supply voltage, and wherein the control circuit is configured to vary the precharge voltage at least in part based on the temperature.

2. The electronic display device of claim 1, wherein the control circuit is configured to control a value of the source supply voltage to increase in response to an increase in the temperature of the electronic display device.

3. The electronic display device of claim 1, wherein the control circuit is configured to control a value of the reset voltage to increase in response to an increase in the temperature of the electronic display device.

4. The electronic display device of claim 1, wherein the control circuit is configured to control the reset voltage in a voltage mirror operation with respect to the source supply voltage so that a value of the reset voltage increases when a value of the source supply voltage increases and the value of the reset voltage decreases when the value of the source supply voltage decreases.

5. The electronic display device of claim 1, wherein the control circuit is configured to cause different values of the source supply voltage or a respective reset voltage, or both, to be supplied to the one or more self-emissive pixels based at least in part on a gray level associated with the one or more self-emissive pixels.

6. The electronic display device of claim 5, wherein the control circuit is configured to control a value of the source supply voltage to increase in response to a decrease in the gray level associated with the one or more self-emissive pixels.

7. The electronic display device of claim 5, wherein the control circuit is configured to control a respective value of the reset voltage to increase in response to a decrease in the gray level associated with the one or more self-emissive pixels.

8. Electronic display circuitry comprising:

a temperature sensing circuit to determine a temperature of a display area, wherein the display area comprises one or more self-emissive pixels comprising respective light-emitting elements;

a source voltage circuit configured to adjust a value of a source supply voltage provided to the display area based at least in part on the temperature; and a reset voltage circuit configured to adjust a value of a reset voltage provided to the display area based at least in part on the temperature, wherein the reset voltage comprises a precharge voltage applied to the respective light emitting elements, wherein the precharge voltage has a value higher than the source supply voltage, and wherein the reset voltage circuit is configured to vary the precharge voltage at least in part based on the temperature.

9. The electronic display circuitry of claim 8, wherein the source voltage circuit is configured to increase the value of the source supply voltage in response to an increase in the temperature of the display area.

10. The electronic display circuitry of claim 9, wherein the reset voltage circuit is configured to increase the value of the reset voltage in response to the increase in the temperature of the display area.

11. The electronic display circuitry of claim 8, wherein the reset voltage circuit is configured to perform a voltage mirror operation with respect to the source supply voltage so that the value of the reset voltage increases when the value of the source supply voltage increases and the value of the reset voltage decreases when the value of the source supply voltage decreases.

12. The electronic display circuitry of claim 8, wherein the source voltage circuit is configured to adjust the value of the source supply voltage provided to the display area based at least in part on a gray level of the display area.

13. The electronic display circuitry of claim 12, wherein the reset voltage circuit is configured to adjust the value of the reset voltage provided to the display area based at least in part on the gray level of the display area.

14. The electronic display circuitry of claim 13, wherein the reset voltage circuit is configured to perform a voltage mirror operation with respect to the source supply voltage so that the value of the reset voltage increases when the value of the source supply voltage increases and the value of the reset voltage decreases when the value of the source supply voltage decreases.

15. An electronic display device, comprising:

an electronic display comprising a plurality of pixels, wherein each of the plurality of pixels comprises a respective light-emitting element; and a control circuit configured to adjust a plurality of reset voltages and a plurality of source supply voltages provided to the plurality of pixels based on one or more temperatures associated with the plurality of pixels of the electronic display, wherein each of the plurality of reset voltages comprises a respective precharge voltage applied to the respective light emitting element, wherein the respective precharge voltage has a respective value higher than a respective source supply voltage of the plurality of source supply voltages for the respective light emitting element, wherein the control circuit is configured to vary the respective precharge voltage at least in part based on the one or more temperatures.

16. The electronic display device of claim 15, wherein the control circuit is configured to increase at least a portion of the plurality of reset voltages and a portion of the plurality of source supply voltages when the one or more temperatures increase.

17. The electronic display device of claim 15, wherein the control circuit is configured to decrease at least a portion of the plurality of reset voltages and a portion of the plurality of source supply voltages when the one or more temperatures decrease.

18. The electronic display device of claim 15, wherein each of the plurality of reset voltages comprises a respective red component, a respective green component, and a respective blue component, wherein each component of each of the plurality of reset voltages is configured to perform respective voltage mirror operation with respect to a respective source supply voltage of the plurality of source supply voltages, so that a value of each component of each of the plurality of reset voltages increases when a value of the respective source supply voltage of the plurality of source supply voltages increases and the value of each component of each of the plurality of reset voltages decreases when the value of the respective source supply voltage of the plurality of source supply voltages decreases.

19. The electronic display device of claim 18, wherein the control circuit is configured to adjust each component of each of the plurality of reset voltages independently.

20. The electronic display device of claim 15, wherein the control circuit is further configured to adjust the plurality of reset voltages and the plurality of source supply voltages provided to the plurality of pixels based on respective brightness levels of the plurality of pixels.

21. The electronic display device of claim 15, comprising a temperature-sensing circuit configured to detect the one or more temperatures associated with the plurality of pixels.

22. The electronic display device of claim 15, comprising processing circuitry configured to estimate the one or more temperatures associated with the plurality of pixels.

* * * * *